US010373193B2

(12) United States Patent
Richardson et al.

(10) Patent No.: US 10,373,193 B2
(45) Date of Patent: Aug. 6, 2019

(54) LEARNING DISPLAY PARAMETERS TO MAXIMIZE ADVERTISING REVENUE

(75) Inventors: Matthew Richardson, Seattle, WA (US); Hrishikesh Bal, Bellevue, WA (US); Deepak Bapna, Redmond, WA (US); Mikhail Bilenko, Bellevue, WA (US); Anthony Crispo, Issaquah, WA (US); Ewa Dominowska, Kirkland, WA (US); Arunesh Gupta, Seattle, WA (US); Marty Kauhanen, Seattle, WA (US); Scott Schult, Buffalo, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 852 days.

(21) Appl. No.: 12/818,157

(22) Filed: Jun. 18, 2010

(65) Prior Publication Data

US 2011/0313845 A1    Dec. 22, 2011

(51) Int. Cl.
*G06Q 30/02* (2012.01)

(52) U.S. Cl.
CPC ..... *G06Q 30/0243* (2013.01); *G06Q 30/0244* (2013.01)

(58) Field of Classification Search
USPC ............. 705/14.4, 14.43, 14.49, 14.5, 14.72, 705/14.73, 14; 715/267; 707/3
See application file for complete search history.

(56) References Cited

U.S. PATENT DOCUMENTS

| | | | |
|---|---|---|---|
| 2004/0123247 A1* | 6/2004 | Wachen | G06F 17/243 715/267 |
| 2006/0212350 A1* | 9/2006 | Ellis | G06Q 30/0242 705/14.41 |
| 2007/0027754 A1 | 2/2007 | Collins et al. | |
| 2007/0260520 A1 | 11/2007 | Jha et al. | |
| 2008/0114639 A1 | 5/2008 | Meek et al. | |
| 2008/0262913 A1 | 10/2008 | Reitz et al. | |
| 2009/0024480 A1 | 1/2009 | Dai | |
| 2009/0119179 A1 | 5/2009 | Kolve et al. | |
| 2010/0042421 A1 | 2/2010 | Bai et al. | |
| 2011/0054980 A1* | 3/2011 | Simons et al. | 705/10 |

OTHER PUBLICATIONS

"Amdocs Offering for Internet & Mobile Local Advertising", Amdocs, Retrieved at <<http://www.amdocs.com/Documents/Advertising-Media/Amdocs_Offering_For_Local_Digital_Advertising.pdf>>, 2009, pp. 28.

* cited by examiner

*Primary Examiner* — Saba Dagnew
(74) *Attorney, Agent, or Firm* — Jeffrey L. Ranck; Ranck IP Law

(57) ABSTRACT

In one embodiment, an evolving advertising system automatically optimizes internet advertising. A data storage unit 250 may store an evolving advertisement unit 320 with an advertisement characteristic according to an initial configuration parameter. A communication interface 280 may transmit the evolving advertisement unit 320 as part of a primary website 310. A processor 220 may alter the evolving advertisement unit 320 automatically upon a trigger event by changing the advertisement characteristic to follow an automatically generated configuration parameter to optimize an advertisement performance metric.

20 Claims, 7 Drawing Sheets

| AD ID 402 | CONTENT 404 | AGE 406 | CHAR 408 | CONSTRAINT 410 | ICP 412 | AGCP 414 | SEASON 416 | METRIC 418 | WT 420 |
|---|---|---|---|---|---|---|---|---|---|

*400*
Figure 4

| SITE ID 502 | CONTENT 504 | CHAR 506 | SCP 508 | METRIC 510 | WT 512 |
|---|---|---|---|---|---|

*500*
Figure 5

| USER ID 602 | CONTENT 604 | AD CHAR 606 | UCP 608 | METRIC 610 | WT 612 |
|---|---|---|---|---|---|

*600*
Figure 6

LEARNING DISPLAY PARAMETERS TO MAXIMIZE ADVERTISING REVENUE

BACKGROUND

Maintaining a website on the internet may entail a great deal of cost, based on server fees, bandwidth fees, and other expenditures. A website is any source for digital data maintained by a server on the internet. One revenue generating option is to provide advertising space on the website to an advertising platform. The advertising platform may then project an online advertisement on the website. While the content of the online advertisement may generally be provided by a client, the advertisement characteristics may be controlled, for the most part, by an advertising platform. The client is the entity paying for the advertising, usually for a brand, product or service sold by the client, while the advertising platform is the entity providing the advertising. The content of the advertisement is the information provided by the client contained in the advertisement. The advertisement characteristics are the stylistic elements of the advertisement used to present the content of the advertisement to the user.

Some examples of advertisement characteristics may include the advertising background, the advertising title text properties, the advertising description text properties, the advertising display uniform resource locator (URL), a sponsored link bar, the sponsored link text properties, special effects, and border descriptions. The advertising background may be described by parameters that include color, gradient, transparency, and patterns. The advertising title text properties may be described by parameters that include font face, color, size, and style. The advertising description text properties may be described by parameters that include font face, color, size, and style. The advertising display URL may be described by parameters that include font face, color, size, and style. The sponsored link may be described by parameters that include color, location, and string. The sponsored link text properties may be described by parameters that include font face, color, size, and style. The special effects may be described by parameters that include a drop shadow or a semi-transparent shadow. The border descriptions may be described by parameters that include thickness, corner shape, or colors.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to optimizing online advertising. A data storage unit stores an evolving advertisement unit with an advertisement characteristic according to an initial configuration parameter. A communication interface transmits the evolving advertisement unit as part of a primary website. A processor alters the evolving advertisement unit automatically upon a trigger event by changing the advertisement characteristic to follow an automatically generated configuration parameter to optimize an advertisement performance metric.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 4 illustrates, in a block diagram, one embodiment of an advertisement profile.

FIG. 5 illustrates, in a block diagram, one embodiment of a site profile

FIG. 6 illustrates, in a block diagram, one embodiment of a user profile.

DETAILED DESCRIPTION

Figure 1:
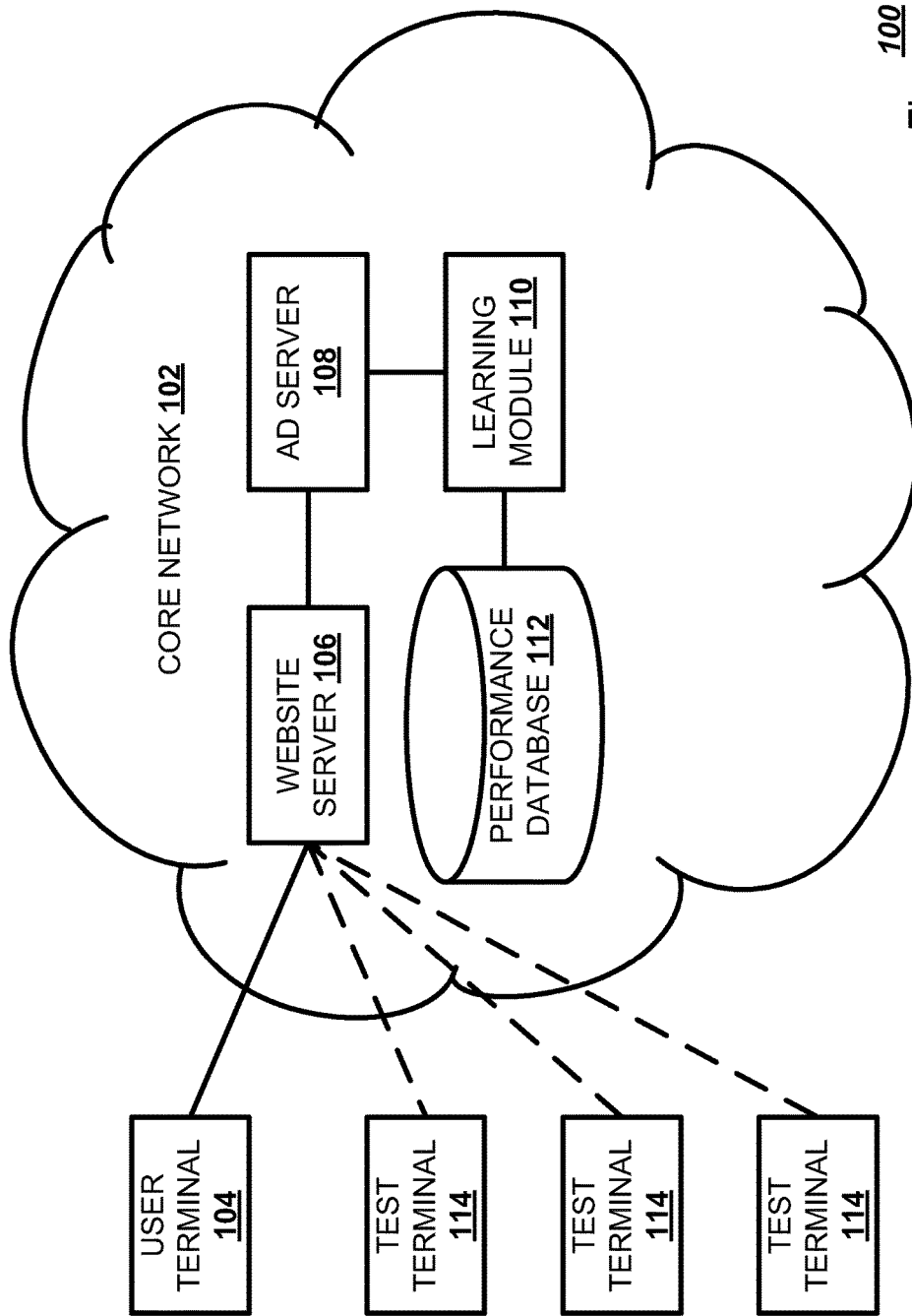
FIG. 1 illustrates, in a block diagram, one embodiment of a network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or an internet advertising system for a computing device.

Online advertising has become a useful revenue stream for most websites. An advertising platform wants to make sure that the online advertising is effective. The effectiveness of the online advertising may rely on both the brand, product, or service being sold, referred to herein as the content, and the presentation selling the brand, product, or service, referred to herein as the advertising characteristics. The content may generally be left to the client purchasing the advertising. The advertising characteristics may be manipulated by the advertising platform to select an optimum advertising characteristic.

Determining an optimum advertising characteristic may be a time intensive process. Calibrating the optimum advertising characteristics may be further complicated by the fact that an effective advertising characteristic may lose effectiveness over time as a user is continually exposed to that advertising characteristic. Additionally, an effective advertising characteristic during the summer may no longer be effective during the holiday season. For example, a green and red banner advertisement may stand out over the summer but not during Christmas time.

An advertising platform may improve the effectiveness of the online advertising using machine learning. In machine learning, the advertising platform may test a large number of similar advertisements for a single product. For online machine learning, the test set of advertisements may be placed on the internet, with the results collected from the internet placements. The advertising platform may make changes to a key advertising characteristic on subsets of those advertisements, and then measure how well the advertisement performs. Those advertising characteristic adjustments that provide a statistically significant improvement in the advertisements performance may be used as the basis for making a similar change to other similar advertisements. The advertising characteristic adjustments may be performed and monitored using traditional statistical methods, such as A/B testing, banded convex optimization, multi-armed bandit solutions, or other statistical methods.

The test set of advertisements may be sorted so that similar advertisements are grouped together, as well as advertisements on similar web sites or advertisements viewed by demographically similar users. Additionally, the advertisement characteristic adjustment may be determined based on the demographic or viewing profile of the user viewing the advertisement. For example, an advertising platform may determine through online machine learning that middle-aged males that make over $100,000 a year and like auto-racing tend to favor advertisements with blue Times New Roman descriptive text. Further, the advertisement characteristic adjustment may be determined based on the website displaying the advertisement. For example, the advertising platform may determine that banner advertisements with a solid red border tend to be more effective on celebrity gossip websites.

Thus, in one embodiment, an evolving advertising system automatically optimizes internet advertising. In this instance, the term "automatically" refers to optimization not initiated by an administrator. A data storage unit may store an evolving advertisement unit with an advertisement characteristic according to an initial configuration parameter. A communication interface may transmit the evolving advertisement unit as part of a primary website. A database interface may connect to a database storing a test performance result from a parallel test run on a test set of advertisement units. A processor may alter the evolving advertisement unit automatically upon a trigger event by changing the advertisement characteristic to follow an automatically generated configuration parameter based on a test performance result to optimize an advertisement performance metric of the evolving advertisement unit. The trigger event is an external event not initiated by an administrator that alerts the advertisement server to alter an advertising characteristic.

FIG. 1 illustrates one embodiment of a communication system 100, such as the internet. The communication system 100 may include a core network 102 that may be accessed by a user terminal 104. The user terminal 104 may also be referred to as subscriber units, desktops, laptops, work stations, mobiles, mobile stations, user, wireless communication devices, user devices, or by other terminology used in the art. Various communication devices may exchange data or information through the core network 102. The core network 102 may be a local area network (LAN), a wide area network (WAN), the internet, a WiMAX network, a universal terrestrial radio access network (UTRAN) cellular network, an evolved UTRAN (E-UTRAN) cellular network, or other type of telecommunication network. A server or a series of servers controlled by a site operator, referred to herein as a website server 106, may administer and provide a website to the user terminal 104. A website server 106 is any server that provides data content to the user terminal 104. A website server 106 may have an arrangement with an advertisement server 108 to allow the advertisement server 108 to attach online advertising content to the website.

The online advertising content may be web page banner advertisements, search engine text advertisements, web page text advertisements, or other forms of online advertising. The advertisement server 108 may be associated with a learning module 110 that accesses a historical performance database 112 to determine the configuration parameters for an advertisement characteristic of an online advertisement to produce a result. The configuration parameters may have produced statistically significant results in other online advertisements or may be suggestions for experimental configuration parameters. The result may be quantified by an advertisement performance metric. The advertisement performance metric may be the number of users that have selected the advertisement and been led to a web page of a client, the number of viewers of the website that have performed a commercial transaction at the web page of the client, the number of positive survey responses, and other metrics. The advertising performance metric may be chosen by the advertising platform or by the client.

The historical performance database 112 may contain a test performance result collected from a test set of advertisement units shown to one or more test terminals 114 in a parallel test run. The test performance result may indicate configuration parameters that produce the optimum result for a given metric in the test set of advertisement units as compared to a control set. The test set of advertisement units may have a similar advertisement profile as the advertisement unit. Similarly, the test set of websites displaying the test set of advertisement units may have a similar site profile as the website. The user terminal 104 may have a similar user profile as the test terminal 114. The user terminal 104 may act as a test terminal 114 in some instances.

Figure 2:
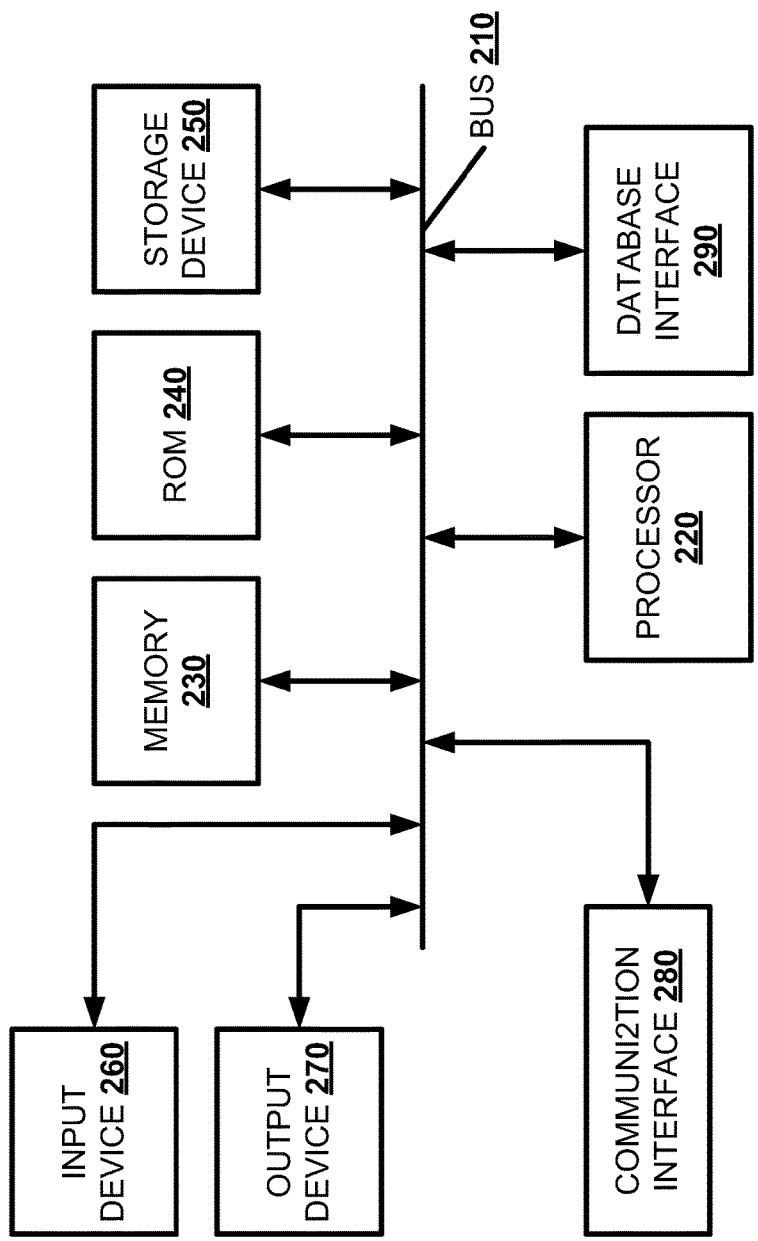
FIG. 2 illustrates, in a block diagram, one embodiment of a computing device.

FIG. 2 illustrates a block diagram of an exemplary computing device 200 which may act as a user terminal 104, a website server 106, or an advertisement server 108. The computing device 200 may include a bus 210, a processor 220, a memory 230, a read only memory (ROM) 240, a storage device 250, an input device 260, an output device 270, a communication interface 280, and a database interface 290. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. The storage device 250 may store a set of instructions detailing a method that when executed by one or more processors cause the one or more processors to perform the method.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables processing device 200 to communicate with other devices or networks. The communication interface 280 may include a network interface or a mobile transceiver interface. The communication interface 280 may be a wireless, wired, or optical interface. In one embodiment, the communication interface 280 may include a universal serial bus (USB) interface, a Bluetooth® interface, or other such interface that may be used to attach peripheral devices or pair other communication devices. A separate database interface 290 may interact with the historical performance database 112.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3:
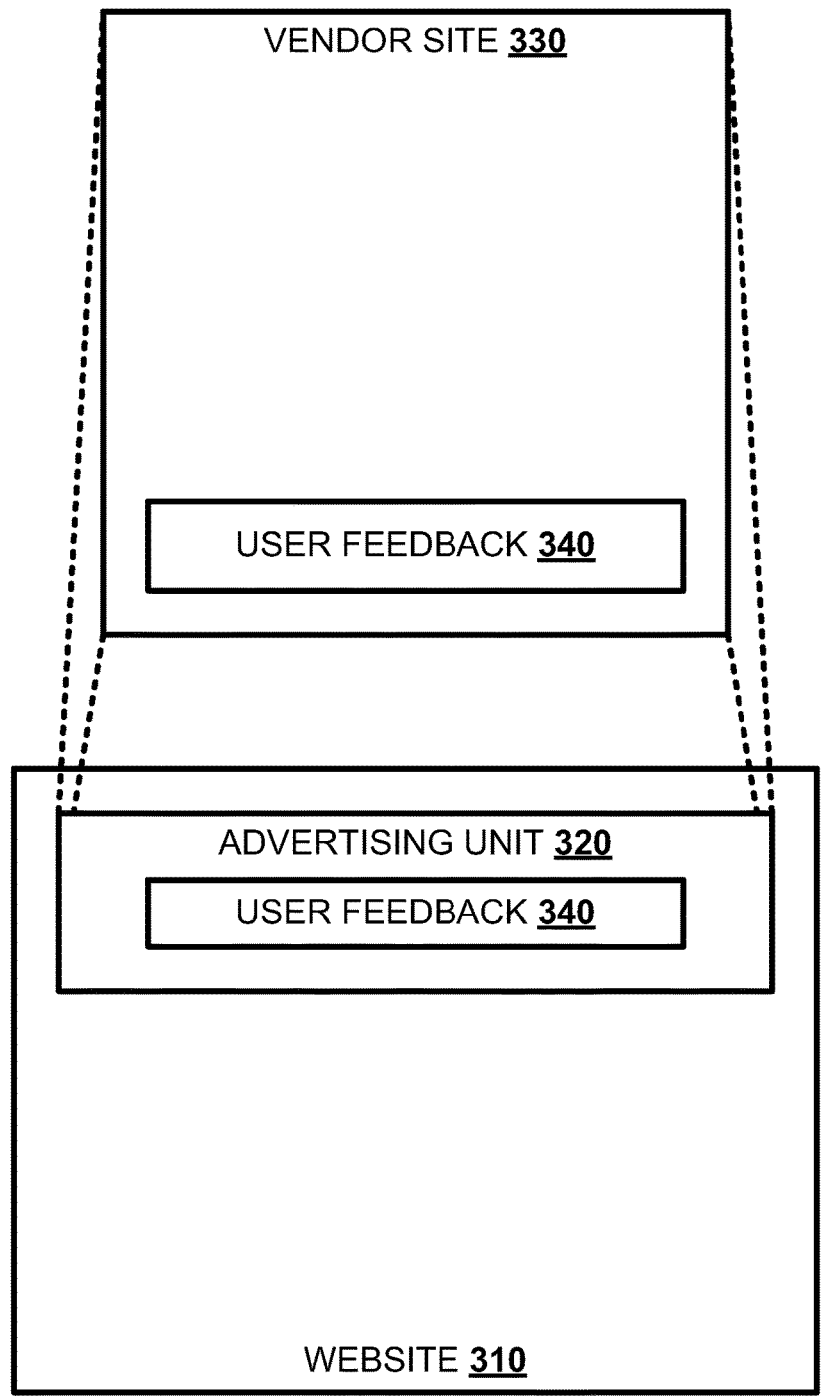
FIG. 3 illustrates, in a block diagram, one embodiment of an advertising supported website.

FIG. 3 illustrates, in a block diagram, one embodiment of a website 300. The website 300 may have a website 310 containing the content data provided by the website server 106. The advertisement server 108 may provide an evolving advertisement unit 320 to be attached to the website 310 when displayed to a user. The evolving advertisement unit 320 has advertisement characteristics that change over time. The advertisement characteristics are stylistic features of the evolving advertisement unit 320 unrelated to the content of the advertisement. The advertisement characteristics of the evolving advertisement unit may include the advertising background, the advertising title text properties, the advertising description text properties, the advertising display uniform resource locator (URL), the sponsored link bar, the sponsored link text properties, special effects, and border description. The advertising characteristics may be initialized from configuration parameters, such as color, gradient, transparency, pattern, font, size, style, location, thickness, or other specific parameters.

The evolving advertisement unit 320 may act as a link to a vendor site 330 owned by the client purchasing the evolving advertisement unit 320. The vendor site 330 may contain information leading to a physical location of the client or may allow the client to sell goods or services online. The vendor site 330 may have a user feedback input 340 to allow a user to critique or grade the effectiveness of the online advertisement. The user feedback input 340 may also be present directly on the evolving advertisement unit 320.

The historical performance database 112 may maintain an advertisement profile of each of the evolving advertisement units 320 distributed by the advertising platform. The historical performance database 112 may also maintain a site profile for each of the websites 310 supported by the advertising platform to tailor the advertisement characteristics of the evolving advertisement unit 320 to the website 310 displaying it. For even greater accuracy, the advertising platform may maintain a user profile for any of the user terminals 104 that view the evolving advertisement units 320. Such records may allow the advertisement server 108 to tailor the advertising characteristics of the evolving advertisement unit 320 to the individual user.

FIG. 4 illustrates, in a block diagram, one embodiment of an advertisement profile 400. The advertisement profile 400 may have an advertisement identifier (ID) 402 to associate the advertisement profile 400 with the evolving advertisement unit 320. The advertisement profile 400 may have an advertisement content profile 404 describing the content being shown in the evolving advertisement unit 320. The advertisement profile 400 may have an age field 406 describing the date that the evolving advertisement unit 320 was first attached to the website 310. The age field 406 may be used to determine when to alter the evolving advertisement unit 320, keeping an evolving advertisement unit fresh. The advertisement profile 400 may have one or more advertisement characteristic fields 408 describing stylistic features of the evolving advertisement unit 320. The advertisement characteristic field 408 may be associated with one or more configuration constraint fields 410 describing any configuration constraints placed on the configuration parameters that may be used by the advertisement characteristics. These configuration constraints may be determined by the website administrator, the advertising platform, the client, or even the user terminal 104. The advertisement characteristic field 408 may be associated with one or more initial configuration parameter (ICP) fields 412 indicating the configuration parameters that may be used in creating an initial form for the associated advertisement characteristic. An ICP field 412 may indicate a configuration parameter for an advertisement characteristic the first time the evolving advertisement unit 320 is displayed on the website 310. The ICP field 412 may be based on the performance of that configuration parameter on other advertisement units 320 on that website 310, the same advertisement unit on other websites 310, or different advertisement units 320 on other websites 310. The advertisement characteristic field 408 may be associated with an automatically generated configuration parameter (AGCP) 414 to indicate a new configuration parameter that the evolving advertisement unit may use to alter an associated advertisement characteristic field 408. The advertisement characteristic field 408 may be altered multiple times by a new AGCP as the evolving advertisement unit 320 ages. The advertisement characteristic field 408 may be associated with a season field 416 to indicate if the advertisement characteristic has a seasonal characteristic, with certain configuration parameters to be used based upon the time of year. Seasonal characteristics are not limited to the traditional summer, fall, winter, spring seasons, but refers to any annual period that may affect an advertisement characteristic, such as the Christmas shopping season or baseball season. The AGCP field 414 may be associated with one or more advertisement performance metric fields 418 indicating a projected score for that advertisement performance metric using the AGCP based upon a test performance result by a test set of advertisement units. The advertisement performance metric field 418 may be associated with a weighting (WT) field 420, allowing multiple performance metrics to be taken into account, while assigning a priority to each performance metric.

FIG. 5 illustrates, in a block diagram, one embodiment of a site profile 500. The site profile 500 may have a site ID 502 to associate the site profile 500 with the website 310. The site profile 500 may have a site content profile 504 describing the content being shown in the website 310. The site profile 500 may have one or more advertisement characteristic fields 506 describing stylistic features of any advertisement units 320 found on the website 310. An advertisement characteristic field 506 may be associated with one or more site configuration parameter (SCP) fields 508 indicating configuration parameters for the advertisement characteristics that have historically worked for that website. The SCP field 508 may be associated with one or more advertisement performance metric fields 510 indicating a projected score for that advertisement performance metric using the SCP based upon previous advertisements on the website 310. The advertisement performance metric field 510 may be associated with a WT field 512, allowing multiple performance metrics to be taken into account, while assigning the priority of each performance metric.

FIG. 6 illustrates, in a block diagram, one embodiment of a user profile 600. The user profile 600 may have a user ID 602 to associate the user profile 600 with the website 310. The user profile 600 may have a user content profile 604 describing the content historically selected by the user, as well as any obtainable demographic information describing the user. The user profile 600 may have one or more advertisement characteristic fields 606 describing stylistic features of any advertisement units 320 historically favored by the user. An advertisement characteristic field 606 may be associated with one or more user configuration parameter (UCP) fields 608 indicating configuration parameters for the advertisement characteristics that have historically been favored by that user. The UCP field 608 may be associated with one or more advertisement performance metric fields 610 indicating a projected score for that advertisement performance metric using the UCP based upon previous advertisements viewed by that user. The advertisement performance metric field 610 may be associated with a WT field 612, allowing multiple performance metrics to be taken into account, while assigning the priority of each performance metric.

Figure 7:
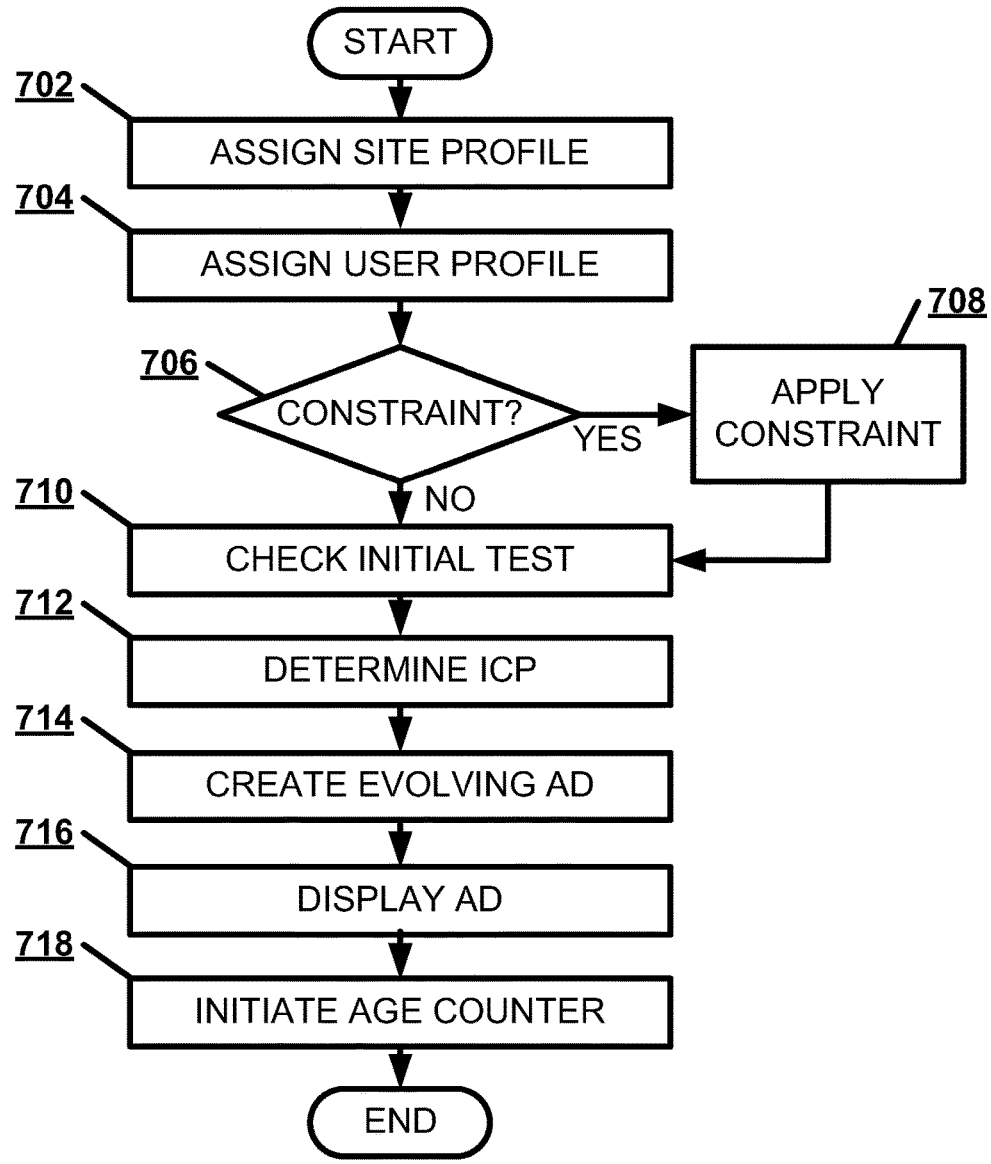
FIG. 7 illustrates, in a flowchart, one embodiment of a method for creating an evolving advertisement unit with an initial configuration.

FIG. 7 illustrates, in a flowchart, one embodiment of a method 700 for creating an evolving advertisement unit 320 with an initial configuration. The advertisement server 108 may assign a site profile 500 to a primary website 310 (Block 702). The advertisement server 108 may assign a user profile 600 to a user viewing the primary website 310 (Block 704). If the advertisement server 108 has received configuration constraints from an administrator (Block 706), the advertisement server 108 may apply the configuration constraint to the appropriate advertisement characteristics of an evolving advertisement unit 320 (Block 708). The advertisement server 108 may check an initial test performance result by a test set of advertisement units (Block 710). The advertisement server 108 may determine ICPs based on the initial test performance results (Block 712). The advertisement server 108 may create the evolving advertisement unit 320 with advertisement characteristics according to the ICPs (Block 714). The advertisement server 108 may display the evolving advertisement unit 320 on a primary website 310 (Block 716). The advertisement server 108 may initiate an advertisement characteristic age counter to measure the age of an advertisement characteristic (Block 718). The age of the advertisement characteristic may be based on period of time since the advertisement characteristic was implemented or the number of views of the advertisement characteristic.

Figure 8:
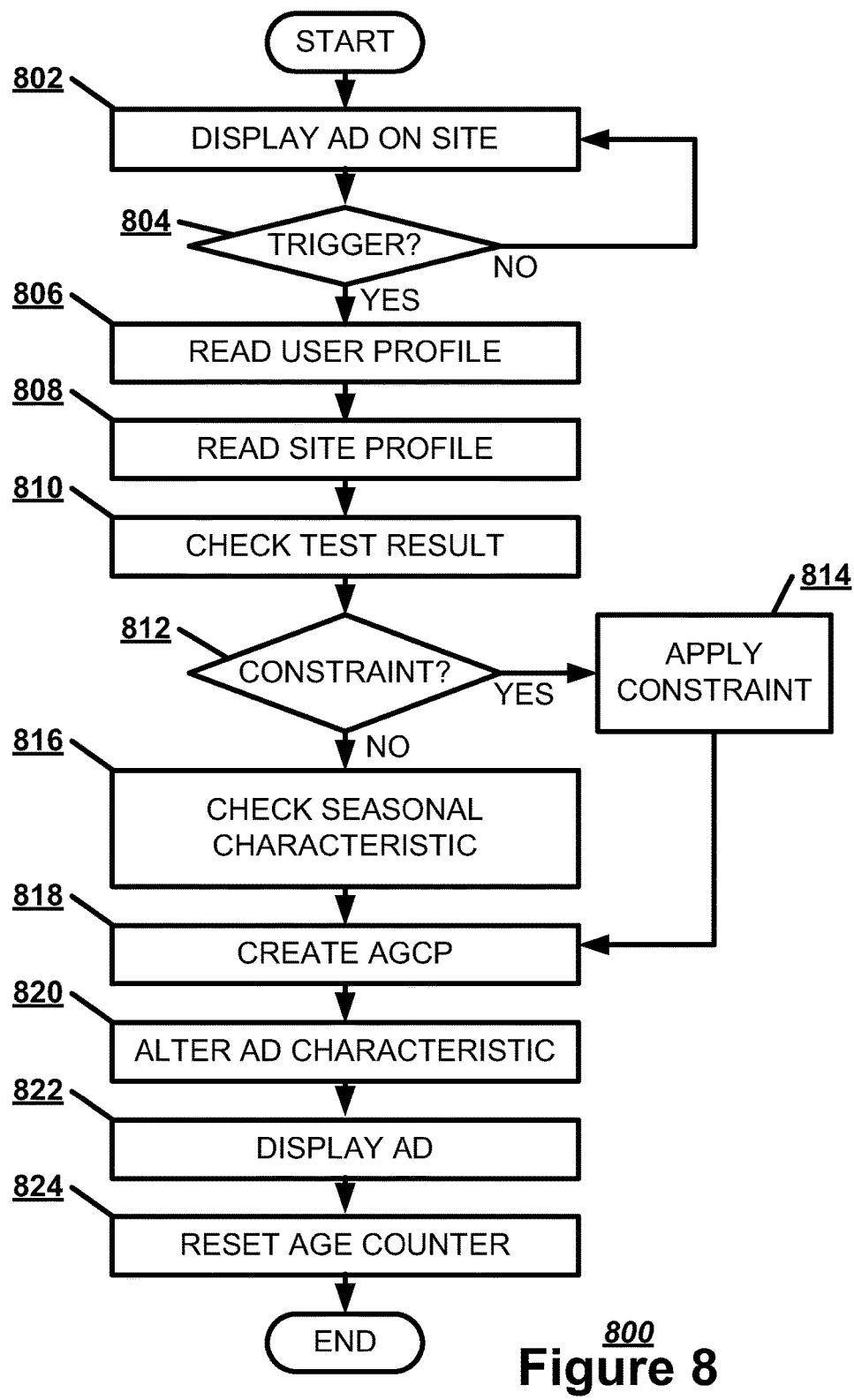
FIG. 8 illustrates, in a flowchart, one embodiment of a method for altering an evolving advertisement unit.

FIG. 8 illustrates, in a flowchart, one embodiment of a method 800 for altering an evolving advertisement unit 320. The advertisement server 108 may display the evolving advertisement unit 320 on a primary website 310 (Block 802). The advertisement server 108 may use a trigger event to initiate a change to the evolving advertisement unit 320. The trigger event may be an advertisement performance metric falling below a threshold rate, an advertisement characteristic reaching a threshold number of views, the expiration of a viewing period, or a seasonal change, such as the beginning of the Christmas shopping season. If the advertisement server 108 identifies a trigger event (Block 804), the advertisement server 108 may read a user profile 600 of the user viewing the website 302 (Block 806). The advertisement server 108 may read a site profile 500 for the website 302 (Block 808). The advertisement server 108 may check test performance results by a test set of advertisement units that were displayed on a website 310 similar to the site profile 500 to a user terminal similar to the user profile 600 (Block 810). If the advertisement server 108 has received configuration constraints from an administrator (Block 812), the advertisement server 108 may apply the configuration constraints to the appropriate advertisement characteristics of an evolving advertisement unit 320 (Block 814). The advertisement server 108 may check if any seasonal characteristics apply to the evolving advertisement unit 320 (Block 816). The advertisement server 108 may create AGCPs based on the test performance results using machine learning, as well as the user profile 600, the site profile 500, any configuration constraints, and any seasonal characteristics (Block 818). The advertisement server 108 may alter the evolving advertisement unit 320 automatically upon the trigger event by changing the advertisement characteristics to follow the AGCPs to optimize one or more advertisement performance metrics (Block 820). The advertisement server 108 may display the evolving advertisement unit 320 on a primary website 310 (Block 822). The advertisement server 108 may reset the advertisement characteristic age counter (Block 824).

Figure 9:
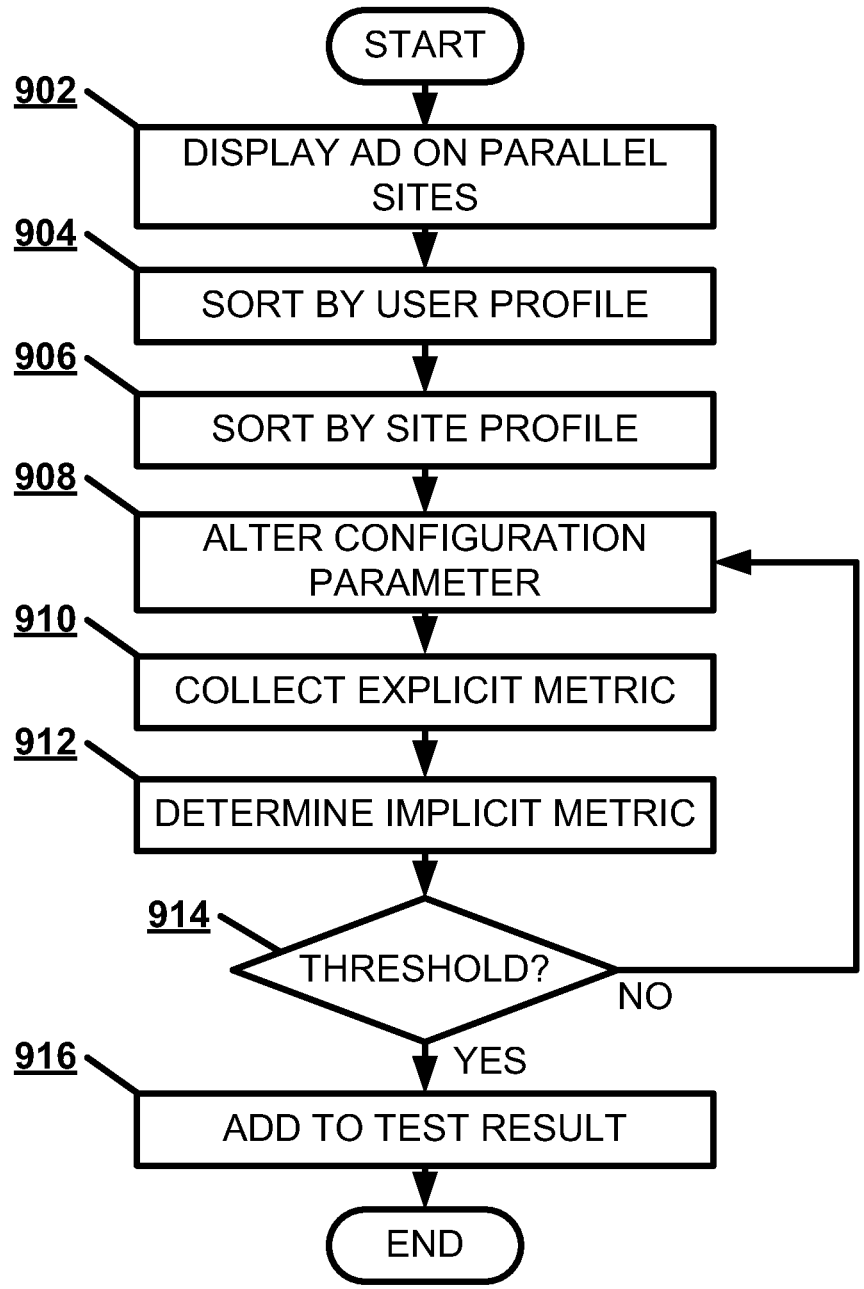
FIG. 9 illustrates, in a flowchart, one embodiment of a method for creating a test performance result.

FIG. 9 illustrates, in a flowchart, one embodiment of a method 900 for creating a test performance result, described here as online machine learning. The test performance result may be an initial test performance result. The advertisement server 108 may display the test set of advertisement units 320 on multiple websites 310 over a similar period, executing a parallel test run (Block 902). The advertisement server 108 may sort the test set of advertisement units by user profiles 600 for the users viewing the advertisement unit 320 (Block 904). The advertisement server 108 may sort the test runs by the site profile 500 of the website 310 hosting the advertisement unit 320 (Block 906). The advertisement server 108 may alter one or more configuration parameters for one or more advertisement characteristics for a subset of the test set, leaving the rest as a control group (Block 908). The advertisement server 108 may collect explicit advertisement performance metrics for the test set of advertisement units (Block 910). An explicit advertisement performance metric is based on actively seeking the affirmative opinion of a user viewing the advertisement unit 320. The advertisement server 108 may determine implicit advertisement performance metrics for the test set of advertisement units (Block 912). An implicit advertisement performance metric is a response to the advertisement unit 320 inferred from the actions of a user viewing the advertisement unit 320. If the explicit advertisement performance metric or the implicit advertisement performance metric is above a pre-set threshold (Block 914), then the change to the configuration parameters may be added to the test performance result (Block 916).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for automatically optimizing web advertising, comprising:
   receiving content provided by a client describing at least one of a brand, a product, and a service;
   creating in a computing device an evolving advertisement unit with a stylistic feature describing at least one of an advertising background, a text property, a special effect, and a border description of the evolving advertisement unit used to present the content;
   creating an advertisement profile comprising:
      an identifier field storing an identifier that associates the advertisement profile with the evolving advertisement unit;
      an initial configuration parameter field indicating an initial stylistic feature for the stylistic feature; and
      an automatically generated configuration parameter to indicate a new stylistic feature for the stylistic feature;
   storing the advertisement profile in a data store;
   displaying, on the computing device, the evolving advertisement unit for the content on a primary website, the evolving advertisement unit utilizing the initial stylistic feature for the stylistic feature;
   identifying, with the computing device, occurrence of a trigger event and responsive to the occurrence of the trigger event:
      retrieving the automatically generated configuration parameter;
      determining the new stylistic feature from the automatically generated configuration parameter;
      altering, with the computing device, the evolving advertisement unit by changing the stylistic feature to follow the new stylistic feature independent of the content; and
   displaying the evolving advertisement unit for the content on the primary website.

2. The method of claim 1, further comprising:
   determining content of the initial configuration parameter field based on an initial test performance result by a test set of advertisement units.

3. The method of claim 1, further comprising:
   creating the automatically generated configuration parameter based on a test performance result by a test set of advertisement units.

4. The method of claim 3, wherein the test performance result is based off a parallel test run on the test set of advertisement units.

5. The method of claim 1, further comprising:
   creating a site profile, the site profile comprising:
      a site identifier for an associated website;
      a site content profile describing content shown on the associated website; and
      at least one advertisement characteristic field describing stylistic features of other advertisement units found on the associated website;
   storing the site profile in the data store; and
   creating the automatically generated configuration parameter based on the site profile.

6. The method of claim 1, further comprising:
   creating a user profile, the user profile comprising:
      a user identifier to associate the user profile with an associated website;
      a user content profile describing content historically selected by a user;
      at least one advertisement characteristic field describing stylistic features of other advertisement historically favored by the user;
   storing the user profile in the data store; and
   creating the automatically generated configuration parameter based on the user profile.

7. The method of claim 1, further comprising:
   creating the automatically generated configuration parameter using machine learning.

8. The method of claim 1, further comprising:
   creating the automatically generated configuration parameter based on a seasonal characteristic.

9. The method of claim 1, further comprising:
   applying a configuration constraint on the automatically generated configuration parameter.

10. The method of claim 1, further comprising:
    collecting an explicit advertisement performance metric.

11. The method of claim 1, further comprising:
    determining an implicit advertisement performance metric.

12. A computing device, having memory configured to store a set of instructions detailing a method stored thereon that when executed by one or more processors cause the one or more processors to perform the method, the method comprising:

receiving content provided by a client describing at least one of a brand, a product, and a service;

displaying an evolving advertisement unit to present the content using a stylistic feature describing at least one of an advertising background, a text property, a special effect, and a border description according to an initial configuration parameter on a primary website;

determining that a trigger event has occurred and responsive to the occurrence of the triggering event:

identifying an automatically generated configuration parameter stored in a profile associated with the evolving advertisement unit;

altering the evolving advertisement unit without creating a new advertisement by changing the stylistic feature to follow the automatically generated configuration parameter independent of the content; and displaying the evolving advertisement unit for the content on the primary website.

13. The computing device of claim 12, wherein the method further comprises:

creating the automatically generated configuration parameter based on a parallel test run on a test set of advertisement units.

14. The computing device of claim 12, wherein the method further comprises:

assigning a site profile to the primary website;
creating the automatically generated configuration parameter based on the site profile.

15. The computing device of claim 12, wherein the method further comprises:

assigning a user profile to a user viewing the primary website;
creating the automatically generated configuration parameter based on the user profile.

16. The computing device of claim 12, wherein the method further comprises:

creating the automatically generated configuration parameter using machine learning.

17. An advertisement server that provides internet advertising, comprising:

a processor and associated executable instructions, which when executed by the processor cause the advertisement server to perform operations comprising:

receiving content provided by a client describing at least one of a brand, a product, and a service;

creating an advertisement profile comprising:

an identifier field storing an identifier that associates the advertisement profile with an evolving advertisement unit;

an initial configuration parameter indicating an initial stylistic feature for a stylistic feature of the evolving advertisement unit; and an automatically generated configuration parameter to indicate a new stylistic feature for the stylistic feature;

at least one advertisement constraint field describing configuration constraints placed on the automatically generated configuration parameter and the initial configuration parameter; and storing the advertisement profile in a data store;

create an evolving advertisement unit comprising the content and stylistic features derived from the initial configuration parameter and accounting for the at least one advertisement constraint field, the evolving advertisement unit associated with the advertisement profile through the identifier field;

causing display of the evolving advertisement unit on an associated website;

identifying, by the processor, occurrence of a trigger event and responsive to the occurrence of the trigger event:

retrieving the automatically generated configuration parameter;

determining the new stylistic feature from the automatically generated configuration parameter;

altering, by the processor, the evolving advertisement unit without creating a new advertisement by changing the stylistic feature to follow the new stylistic feature independent of the content; and displaying the evolving advertisement unit for the content on the associated website.

18. The advertisement server of claim 17, wherein the operations further comprise receiving an explicit advertisement performance metric from a user.

19. The advertisement server of claim 17, wherein the processor creates the automatically generated configuration parameter using machine learning.

20. The computing device of claim 12 wherein the trigger event comprises one or more of:

an advertisement performance metric falling below a threshold;
an advertisement characteristic reaching a threshold number of views;
expiration of a viewing period; and
a seasonal change.

* * * * *